July 17, 1923.
M. M. KNOWLES ET AL
1,462,414
TRACTOR HITCH
Filed July 1, 1922
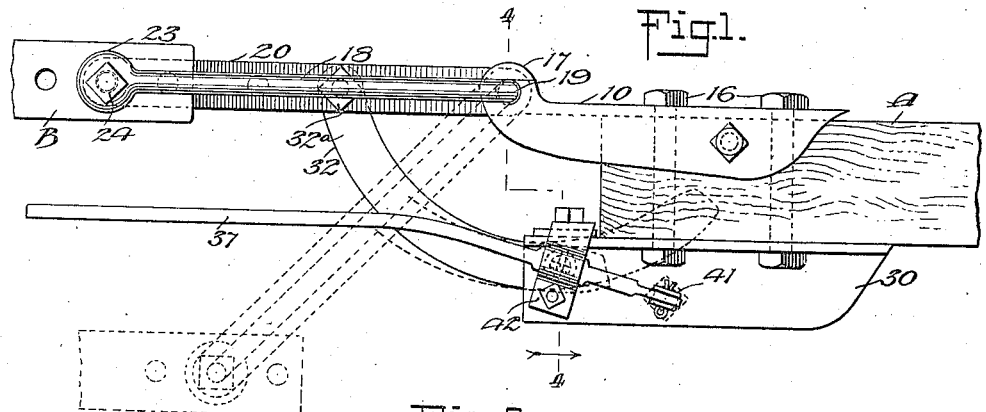
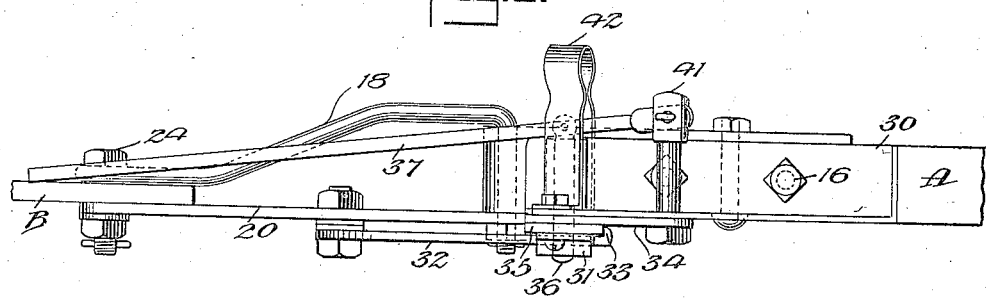
INVENTOR
Madison M. Knowles
James N. Bates Patented July 17, 1923.

1,462,414

UNITED STATES PATENT OFFICE.

MADISON MONROE KNOWLES AND JAMES NICHOLAS BATES, OF FORT BRANCH, INDIANA.

TRACTOR HITCH.

Application filed July 1, 1922. Serial No. 572,130.

*To all whom it may concern:*

Be it known that we, MADISON M. KNOWLES and JAMES N. BATES, citizens of the United States of America, and residents of Fort Branch, in the county of Gibson and State of Indiana, have invented a new and Improved Tractor Hitch, of which the following is a description.

Our invention relates to a tractor hitch and particularly relates to a hitch device adapted for connection with the stub tongue of the binder or similar machine or implement with which the side draft of the hitch is to be effected.

The present invention lends itself especially to the hitch device forming the subject matter of an application for patent filed by us August 10, 1921, Serial Number 491,162.

The general object of the present invention is to provide a brace that will cause a side draft hitch to function as if the hitch were central with the line of draft and which will be free to automatically adjust itself to a complete turning movement of the tractor and yet be adapted to be made rigid as is desirable when operating over rough ground.

Reference is to be had to the accompanying drawings forming a part of this specification, it being understood that the drawings are merely illustrative of one example of the invention.

Figure 1 is a plan view of a hitch having our improved brace associated therewith;

Figure 2 is a side elevation thereof;

Figure 3 is an inverted plan view;

Figure 4 is a cross section as indicated by the line 4—4, Figure 1.

In the illustrated example of our invention the numeral 10 indicates a casting adapted to be applied to the stub tongue A of a binder and formed as shown in our patent above referred to, said casting being secured by a bolt 16 passed transversely through a side flange thereof. At its front end the casting 10 is formed with a vertical eye 17 which receives the downturned rear end 19 of a hitch bar 18 which downturned end passes also through the rear end of a flat brace bar 20. The bar 18 has its front end given the form of an eye 23 through which a vertical bolt 24 is passed, said bolt passing also through the rear end of the hitch member of the tractor, conventionally indicated at B and through the front end of the brace bar 20.

The described features are those of our patented device referred to.

In accordance with the present invention of equipping the hitch with a novel brace, a fitting 30 preferably angular in cross section is applied to the tongue A at the opposite side from casting 10 and is here shown as secured by bolts 16. At the under side of the fitting 30 is provided a guide keeper 31 for a brace bar 32 pivoted at its forward end as at 32ª to bar 20 and having a curvature to permit it to slide in the keeper 31 when bar 20 is swung with the eye 17 as the center. The rear end of brace bar 32 is upturned to form a stop shoulder 33 and an element is provided at the rear side of the keeper 31 to be engaged by said shoulder for limiting the forward movement of brace bar 32. In the illustrated example the shoulder 33 engages the rear edge of a plate 35 beneath the angle fitting 30, there being a second plate 34 between the under side of the angle fitting 30 and the keeper 31.

In order to provide for locking the brace 32 to hold the bars 18, 20 against lateral swinging, a vertical lock pin 36 is provided depending from a lever 37 fulcrumed at one end on a post 41 on the fitting 30. The pin 36 has guided movement in a fixed sleeve 38 on fitting 30 and is adapted to pass through the open lower end of the sleeve and through registering holes 39 extending through the plates 34, 35 as well as through a hole 40 in brace bar 32 and through the bottom of keeper 31 to thereby prevent movement of the brace 32. An arched guard 42 is provided in practice over the pin 36 and guide sleeve 38.

With the described device if the pin 36 is out of engagement with the brace 32, said brace may move freely through keeper 31 as the hitch bar 18 and bar 20 jointly swing laterally from side to side. Also, it will be evident that brace 32 may have rearward movement to an extent to permit the swinging of the bars 18, 20 through an arc for the complete turning of the tractor. In travelling over rough ground the pin 36 may be lowered to lock the brace 32 and thereby hold the hitch rigid with the draft in effect a center line draft.

We would state in conclusion that while the illustrated example constitutes a practical embodiment of our invention, we do not limit ourselves strictly to the exact details herein illustrated, since, manifestly, the same can be considerably varied without departure from the spirit of the invention as defined in the appended claims.

Having thus described our invention, we claim:

1. In a tractor hitch, a hitch device, means to dispose the same on a tongue at a side thereof for a side draft connection, a brace pivotally secured to said hitch device, and guide means in which said brace may have movement with the lateral swinging of the hitch device, said guide means including means to mount the same.

2. In a tractor hitch, a side draft hitch device pivoted to have lateral swinging movement, and brace means therefor secured to said device and adapted to accommodate itself to the lateral movements of said hitch device in turning the tractor.

3. In a tractor hitch, side draft hitch devices including a bar having a fixed pivot point at its rear end and adapted to be secured to a tongue at a side thereof, a guide having means for fixedly mounting the same on the tongue to lie at the opposite side from said hitch device, and a brace pivoted to said hitch device to constrain it to partake of the lateral swinging movements of said bar and having movement in said guide device with the said swinging movement of the bar.

4. In a tractor hitch, a side draft hitch device pivoted to have lateral swinging movement with the turning of the tractor, brace means therefor adapted to accommodate itself to the lateral movements of said hitch device, and means to lock said brace against movement for holding the hitch device against lateral movement.

5. In a tractor hitch, a side draft hitch device pivoted to have lateral swinging movement with the turning of the tractor, a curved brace pivotally secured to said hitch device to respond to the lateral movements thereof, and guide means including means to mount the same in position to permit the movement of said brace therein.

6. In a tractor hitch, a side draft hitch device pivoted at its rear end to have lateral swinging movement, a curved brace pivotally secured to said hitch device to respond to the lateral movements thereof, and guide means including means to mount the same in position to permit the movement of said brace therein; together with means to lock said brace to the guide.

7. In a tractor hitch, a side draft hitch device pivoted at its rear end to have lateral swinging movement, brace means therefor adapted to accommodate itself to the lateral movements of said hitch device, and means to limit the forward movement of the brace for limiting the lateral swinging of the hitch device in one direction.

8. In a tractor hitch, a side draft hitch device pivoted at its rear end to have lateral swinging movement, brace means therefor adapted to accommodate itself to the lateral movements of said hitch device, a pin to lock said brace against movement for holding the hitch device rigid, and a lever carrying said pin and adapted to throw the same to locking or release position.

9. In a tractor hitch, a side draft hitch device, brace means therefor adapted to accommodate itself to the lateral movements of said hitch device, a pin to lock said brace against movement for holding the hitch device rigid, a lever carrying said pin and adapted to throw the same to locking or release position, and a guard over said lever at said pin.

10. A tractor hitch including a side draft hitch device adapted to be pivotally mounted on a tongue, an angle fitting adapted to be mounted on the tongue at the opposite side, a keeper on said fitting at the under side, and an arcuate brace pivotally secured at one end to said hitch device and free at its opposite end to have movement in said keeper.

11. A tractor hitch including a side draft hitch device adapted to be mounted on a tongue, an angle fitting adapted to be mounted on the tongue at the opposite side, a keeper on said fitting at the under side, and an arcuate brace pivotally secured at one end to said hitch device; together with a vertical sleeve on said fitting, a pin having guided movement in said sleeve and adapted to engage said brace and keeper for holding the brace against movement, said brace pivotally connected at one end to said hitch device.

MADISON MONROE KNOWLES.
JAMES NICHOLAS BATES.